United States Patent

[11] 3,632,887

[72] Inventors Emile A. Leipp; Michele M. T. Castellengo; Jean-Sylvain R. Lienard, all of Paris; Jacques L. Quinio, Poissy; Jean Sapaly, Paris; Daniel G. Teil, Creteil, all of France
[21] Appl. No. 889,653
[22] Filed Dec. 31, 1969
[45] Patented Jan. 4, 1972
[73] Assignee Agence Nationale de Valorisation de la Recherche A.N.V.A.R. Puteaux, France
[32] Priority Dec. 31, 1968
[33] France
[31] 182925

[54] PRINTED DATA TO SPEECH SYNTHESIZER USING PHONEME-PAIR COMPARISON

4 Claims, 61 Drawing Figs.

[52] U.S. Cl. .......... 179/1 SA
[51] Int. Cl. .......... G10l 1/10
[50] Field of Search .......... 179/1 SA; 35/35 A; 340/148, 149, 146.3, 146.3 MO, 146.3 Q

[56] References Cited

UNITED STATES PATENTS

| | | | |
|---|---|---|---|
| 2,771,509 | 11/1956 | Dudley | 179/1 SA |
| 3,102,165 | 8/1963 | Clapper | 179/1 SA |
| 3,280,257 | 10/1966 | Orthuber | 179/1 SB |
| 3,319,002 | 5/1967 | De Clerk | 179/1 SA |
| 3,344,239 | 9/1967 | Ragland | 179/1 SA |
| 3,492,646 | 1/1970 | Bene | 340/146.3 |
| 3,234,332 | 2/1966 | Belar | 179/1 SA |

*Primary Examiner*—Kathleen H. Claffy
*Assistant Examiner*—Jon Bradford Leaheey
*Attorney*—Abraham A. Saffitz ABSTRACT: Machine for converting a text printed in literal characters into speech, comprising means for converting each literal character into a corresponding binary-coded character, means for comparing groups of a variable number of successive ones of said coded characters and for deriving therefrom the phonetic equivalent of any such group in the form of a coded phoneme, and means including an address matrix for deriving from any two consecutively appearing such coded phonemes the address of a corresponding coded word assembly in a coded phoneme-pair spectrogram store. In the latter store, each spectrogram is written in the form of an assembly of binary-coded words, which represents in digitalized form the short-time spectrogram of a corresponding phoneme pair. As soon as the above-mentioned address is found, the proper word assembly is selected and extracted from the store, and the bits in said words are used to successively control in time the operation of a plurality of oscillators in number equal to that of said words in said assembly, while a sound-reproducing means is simultaneously fed from all of said oscillators.

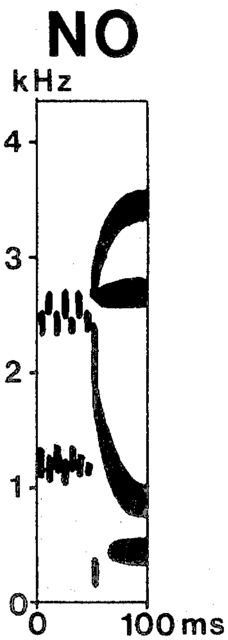
Fig $1_1$
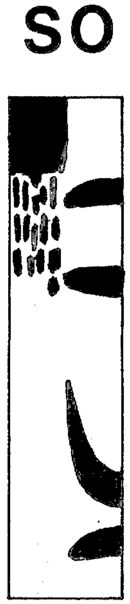
Fig $1_2$
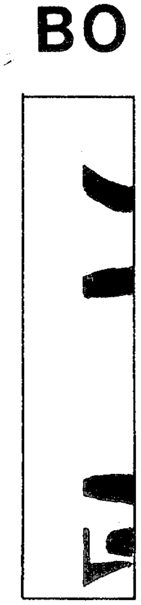
Fig $1_3$
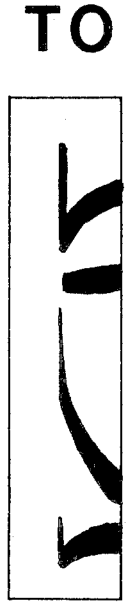
Fig $1_4$
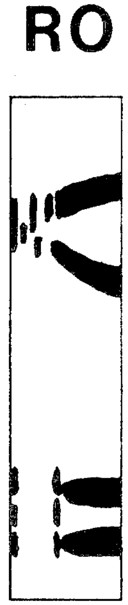
Fig $1_5$
Fig $1_6$
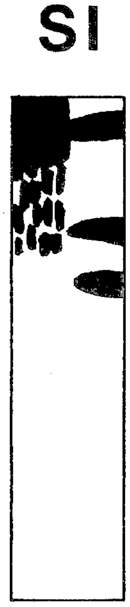
Fig $1_7$
Fig $1_8$
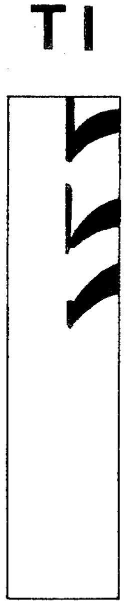
Fig $1_9$
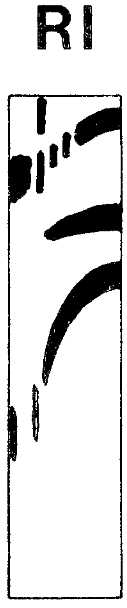
Fig $1_{10}$
INVENTORS
EMILE A. LEIPP, MICHELE M.T. CASTELLENGO,
JEAN-SILVAIN R. LIENARD, JACQUES L. QUINIO,
JEAN SAPALY, DANIEL G. TEIL.
BY Abraham A. Saffitz
ATTORNEY

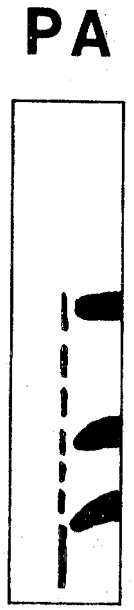
Fig $1_{11}$
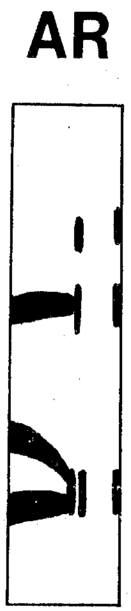
Fig $1_{12}$
Fig $1_{13}$
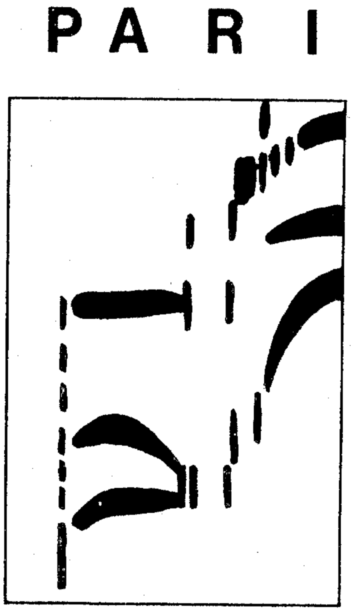
Fig $2_1$

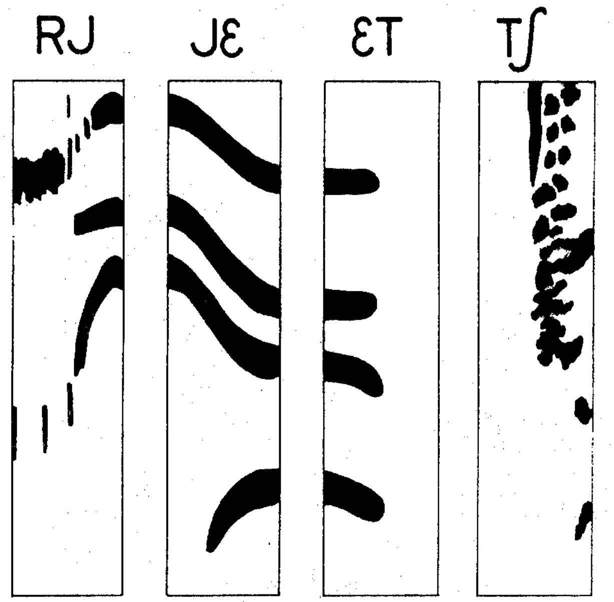
Fig $1_{14}$ Fig $1_{15}$ Fig $1_{16}$ Fig $1_{17}$
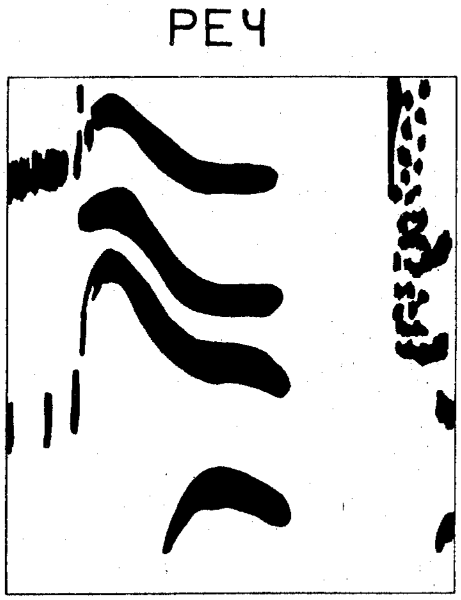
Fig. $2_2$

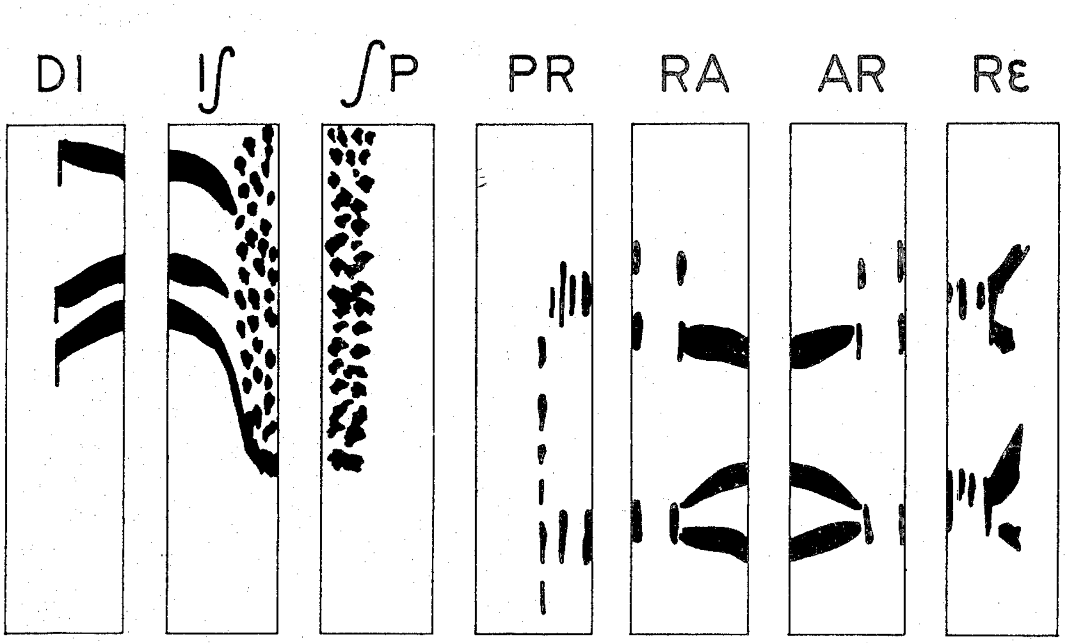
Fig $1_{18}$, Fig $1_{19}$, Fig $1_{20}$, Fig $1_{21}$, Fig $1_{22}$, Fig $1_{23}$, Fig $1_{24}$
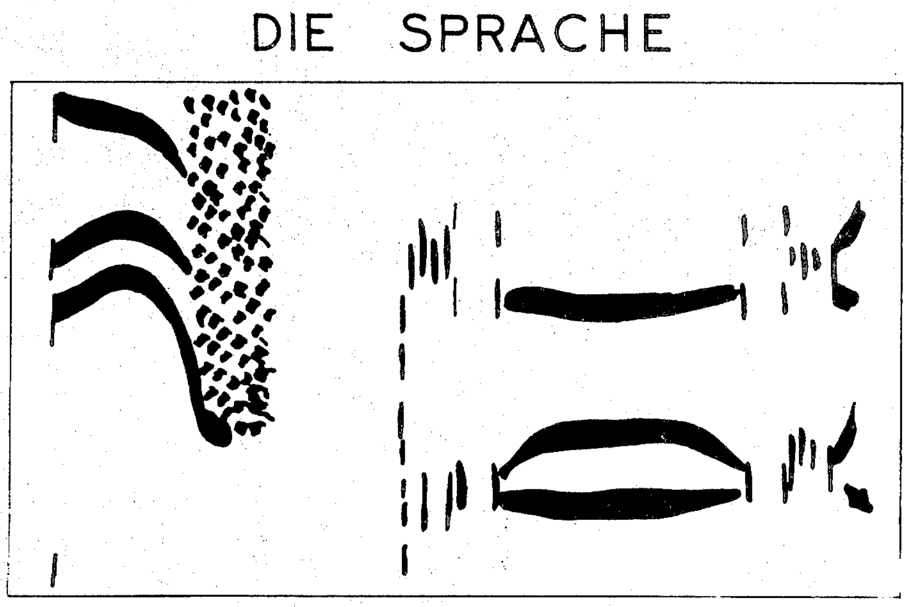
Fig $2_3$

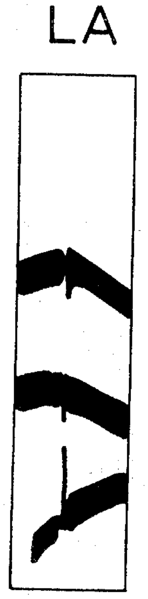
Fig 1$_{25}$
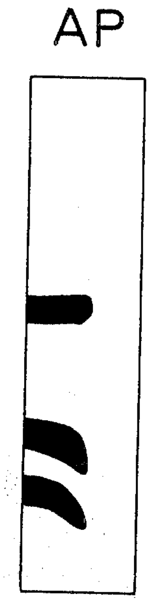
Fig 1$_{26}$
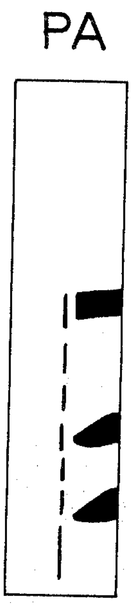
Fig 1$_{27}$
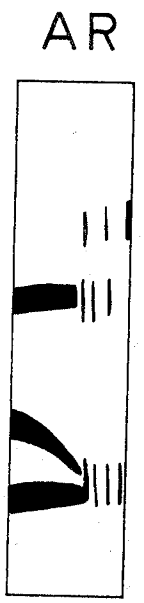
Fig 1$_{28}$
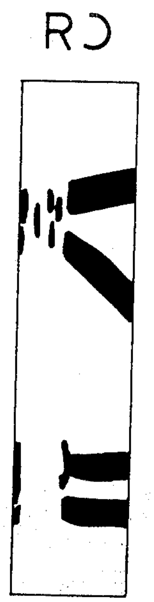
Fig 1$_{29}$
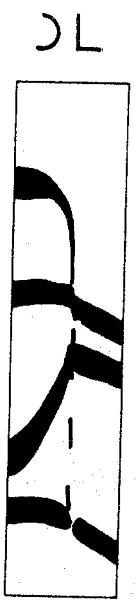
Fig 1$_{30}$
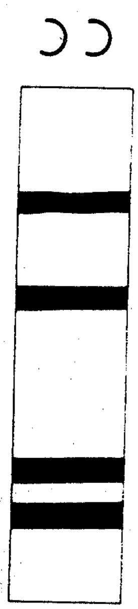
Fig 1$_{31}$
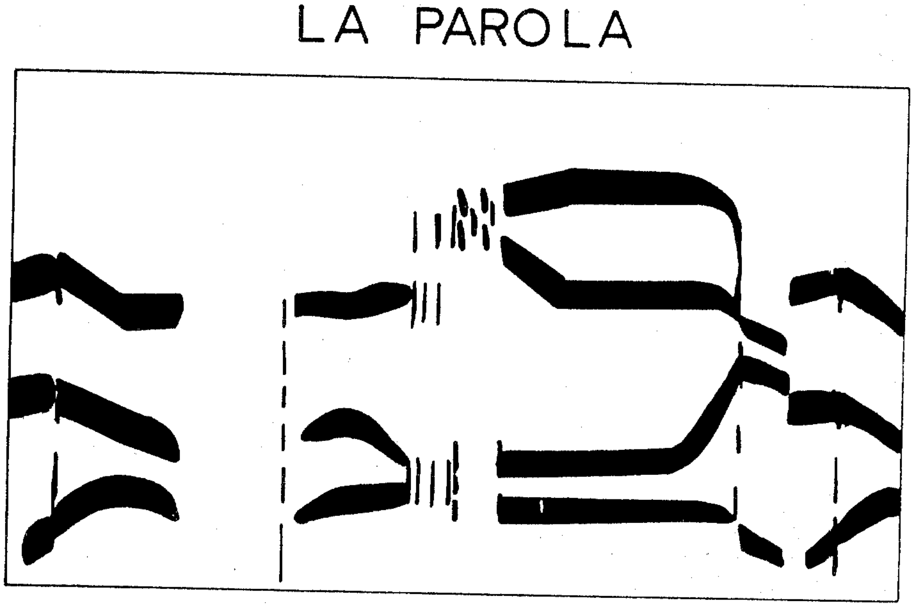
Fig 2$_{4}$

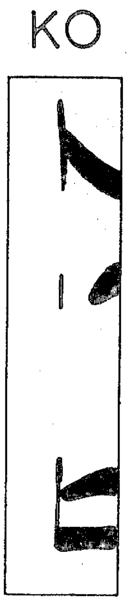
Fig $1_{32}$
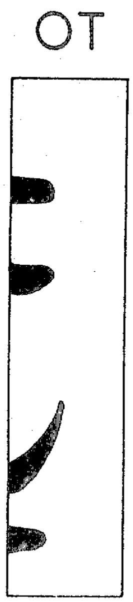
Fig $1_{33}$
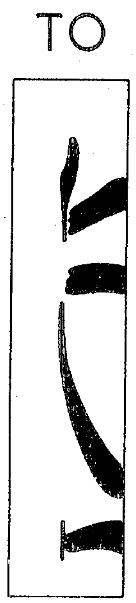
Fig $1_{34}$
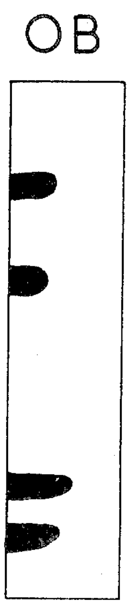
Fig $1_{35}$
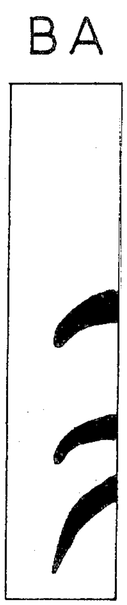
Fig $1_{36}$
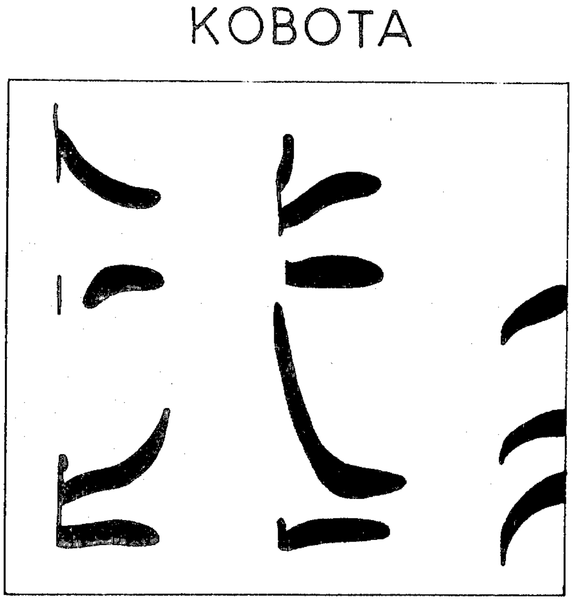
Fig $2_5$

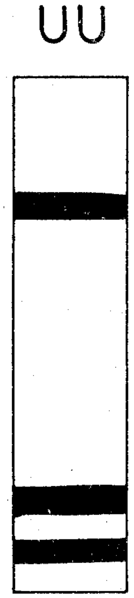
Fig $1_{37}$
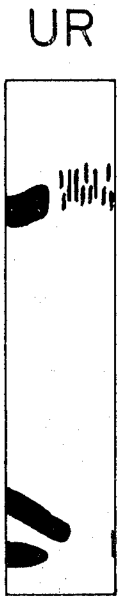
Fig $1_{38}$
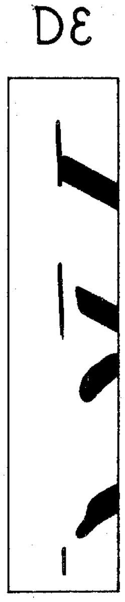
Fig $1_{39}$
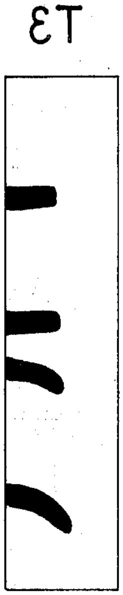
Fig $1_{40}$
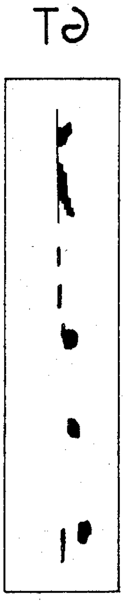
Fig $1_{41}$
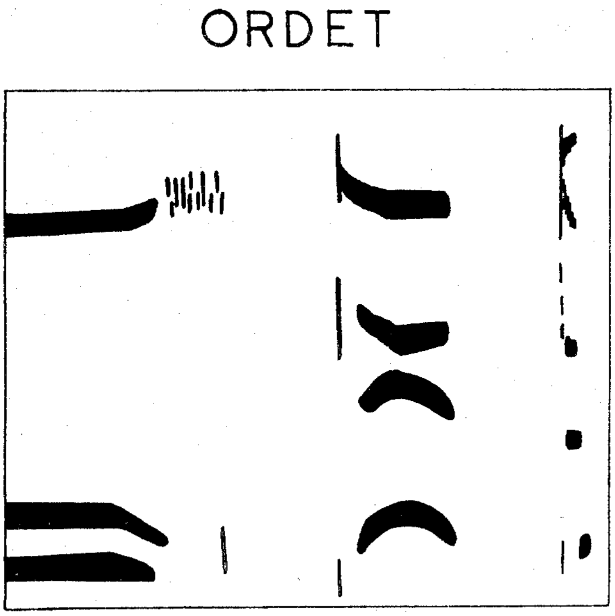
Fig $2_{6}$

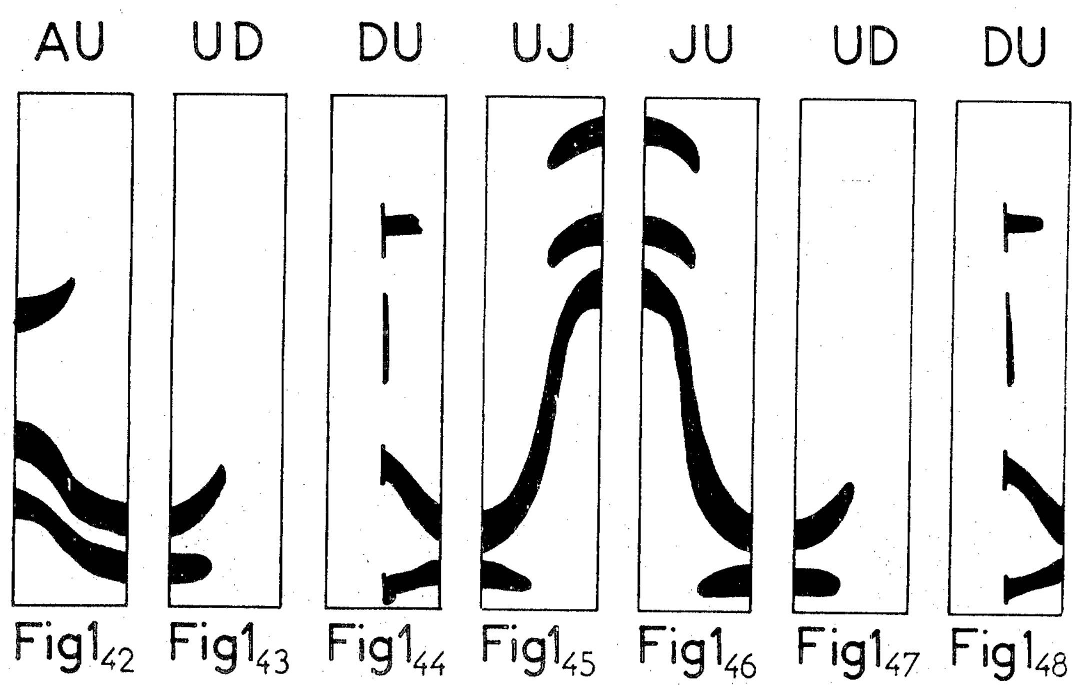
Fig $1_{42}$ Fig $1_{43}$ Fig $1_{44}$ Fig $1_{45}$ Fig $1_{46}$ Fig $1_{47}$ Fig $1_{48}$
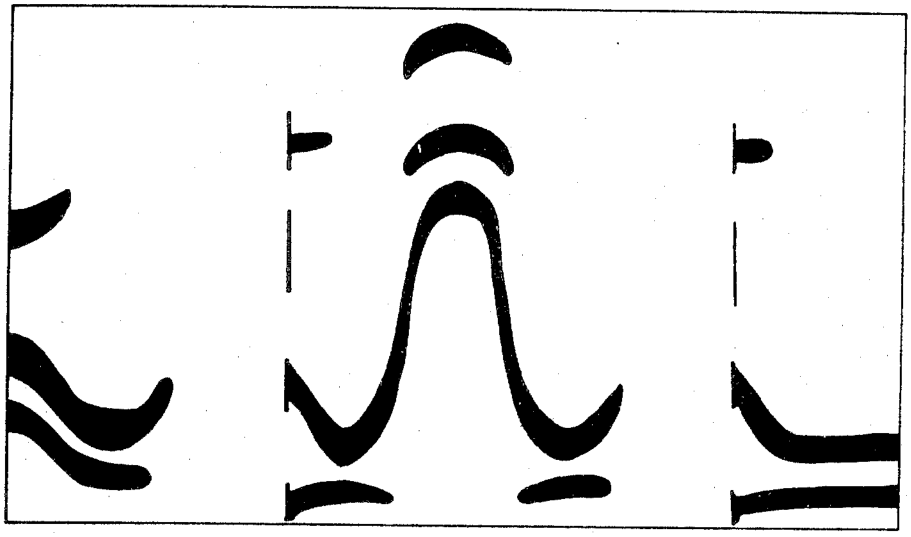
HOW DO YOU DO
Fig $2_7$ 10, 11: DIGITAL TO ANALOG CONVERTERS

PRINTED DATA TO SPEECH SYNTHESIZER USING PHONEME-PAIR COMPARISON

This invention relates to a synthetic speech generator.

The inventors have found from experience that the energy contained in a vocal signal is divided mainly between two different kinds of information, on one hand an aesthetic or musical information, and on the other hand a semantic information, that is a message having a defined significance, irrespective of the particular quality of the speaker's voice. the former kind of information is that thanks to which, on hearing the same word pronounced by different people, it is possible to distinguish warm voices, nuanced voices, muffled voices, sharp voices, etc. This teaches us nothing about the actual message, except in certain special rare cases in which the meaning of the sentence may change with the "tone" in which it is said. For instance, the phrase, "Just try to come nearer," can mean either "Make an effort to come nearer" or "I strongly advice you not to come nearer." The tone depends on variations in the pitch of the voice and the rhythm of the words. In this context, it must be emphasized that the pitch of the voice comprises two very distinct aspects:

1. The pitch of the harmonic spectrum delivered by the vocal chords. Experience shows that its perception has nothing to do with any counting of the frequency of the fundamental, the best proof being that the latter can be cut without modifying the perceived pitch of a harmonic spectrum.

2. Pitch of the formative elements. A band noise produces a pitch sensation which decreases in clarity in proportion as the band is wider. However, in contrast, the variations in pitch of a noise band can be clearly perceived.

The musical character of a voice is determined by its frequency line spectrum, but semantic information is clearly not vehicled by the line spectrum. Experience on telephone communication shows that a fairly narrow pass band does not destroy the intelligibility of words. Anything exceeding 4,000 Hz. is unnecessary and can, therefore, be considered redundant. The conclusion is that the essential part of the semantic information lies below such frequency, this fact limiting and considerably simplifying the problem.

It is also found that intelligibility is complete in a whispered voice which, by definition, comprises no line spectrum since the vocal chords are disconnected to produce the whisper. This simple observation shows that the whispered voice filtered above 4,000 Hz. contains all the semantic information.

A word must be considered to be a program of movements of the human sound-producing apparatus. This program is to be found in full in the sonagrams (also called spectrograms) of a whispered voice, in the form of a structure varying in the time where all the operating elements of the said apparatus are to be found. In brief, the sonagraphic image of a word in a whispered and filtered voice takes an original overall form which is impossible to confuse with another one and is stereotyped enough for it to be recognizable as the same when spoken by two different persons without any ambiguity. This image is, in fact, the informational acoustic skeleton of the word, and represents the minimum necessary and sufficient to recognize the word.

It will be recalled that a sonagram is a representation of a sound in a time-frequency plane, the amplitude at each point of the plane being represented by the more or less dark color of the drawing. Therefore, to understand a word is to identify an acoustic shape.

It is known, for instance, from a paper by W. S-Y. Wang and G. D. Peterson published in the "Journal of the Acoustical Society of America," Vol. 30, 1958, No. 8, pages 743–746, that each overall shape representing a word can be broken down into shape elements which can be connected to one another. Each of the shape elements corresponds not to a phoneme but to movement of the human sound-producing apparatus between two adjacent phonemes. A word cannot therefore be broken down phonetically into phonemes, but only into phonetic elements which are associations of two phonemes and which, in view of their indivisible nature, will be referred to as phoneme pairs hereinafter.

For instance, the word Paris (pronounced in the French manner) is not the sum of four phonemes P, A, R, I, but the linking up of three phoneme pairs PA–AR–II, or four phoneme pairs PA–AR–RI–II, when the word Paris is on its own or at the end of a sentence.

The analog sonagrams of the phoneme pairs from which the digitalized sonagrams used in the machine according to the present invention are derived are idealized and standardized sonagrams. A start is made from a rough sonagram of a whispered voice, recorded with a sonagraph. This sonagram is refined by freeing it from all elements not significant for intelligibility and framed and dimensioned in time and frequency. The sonagram thus refined is digitalized, as will be seen hereinafter, and tried out in the machine according to the invention to check its intelligibility.

Since most languages do not employ more than 30 (or in some cases 50) phonemes, these phonemes can be distributed in lines and columns, and a phonatom which is at the point of intersection on the line and column can be made to correspond with a phoneme in the line and a phoneme in the column. A phonatom can therefore be defined by two addresses of five bits, the first of which is the address of the first phoneme in the line and the second the address of the second phoneme in the column.

The machine of the invention does not use analog sonagrams in the form in which they could be recorded by means of the apparatus employed in the well-known "Visible speech" technique. On the contrary, the machine uses digitalized sonagrams derived from the said analog sonagrams and from which are derived groups of coded words stored in binary-coded from in a store (memory) of the type used in digital computers. Conversion of each analog sonagram into the corresponding digitalized sonagram is not effected in the machine, but previously and by independent means. A possible method is the following:

The analog sonagrams assumed to be recorded on paper are read off by aligned photoelectric cells past which they move, the time axis of the sonagrams being the axis of movement. The sonagram advances by increments, corresponding to a time which can be adjusted between 1 and 8 milliseconds. For each position reached, the signal picked up by each cell is converted to unity or zero, in dependence on whether it is higher or lower than a certain threshold. All the so-obtained digital signals corresponding to a same sonagram are stored in the form of a group of binary coded "words" in a corresponding element of a general store contained in the machine and hereinafter designated as "phoneme-pair store," although it might more properly be called "store of digitalized sonagrams individually representing all possible pairs of consecutive phonemes" in the considered language.

The invention will now be described in detail with reference to the accompanying drawings, wherein:

FIGS. $1_1$–$1_{13}$ show analog short-time spectrograms of some phoneme-pairs of the French langauge.

FIGS. $1_{14}$–$1_{17}$ represent analog short-time spectrograms of some phoneme-pairs of the Russian language.

FIGS. $1_{18}$–$1_{24}$ represent analog short-time spectrograms of some phoneme-pairs of the German language.

FIGS. $1_{25}$–$1_{31}$ represent analog short-time spectrograms of some phoneme-pairs of the Italian language.

FIGS. $1_{32}$–$1_{36}$ represent analog short-time spectrograms of some phoneme-pairs of the Japanese language.

FIGS. $1_{37}$–$1_{41}$ represent analog short-time spectrograms of some phoneme-pairs of the Swedish language.

FIGS. $1_{42}$–$1_{48}$ represent analog short-time spectrograms of some phoneme-pairs of the English language. FIGS. $2_1$–$2_7$ represent analog short-time spectrograms of the successive phoneme-pairs of some words or sentences in the French, Russian, German, Italian, Japanese, Swedish and English languages, respectively.

The nature of the analog spectrograms shown in FIGS. $1_1$ to $1_{48}$ and $2_1$ to $2_7$ is self-explaining.

Figure 3:
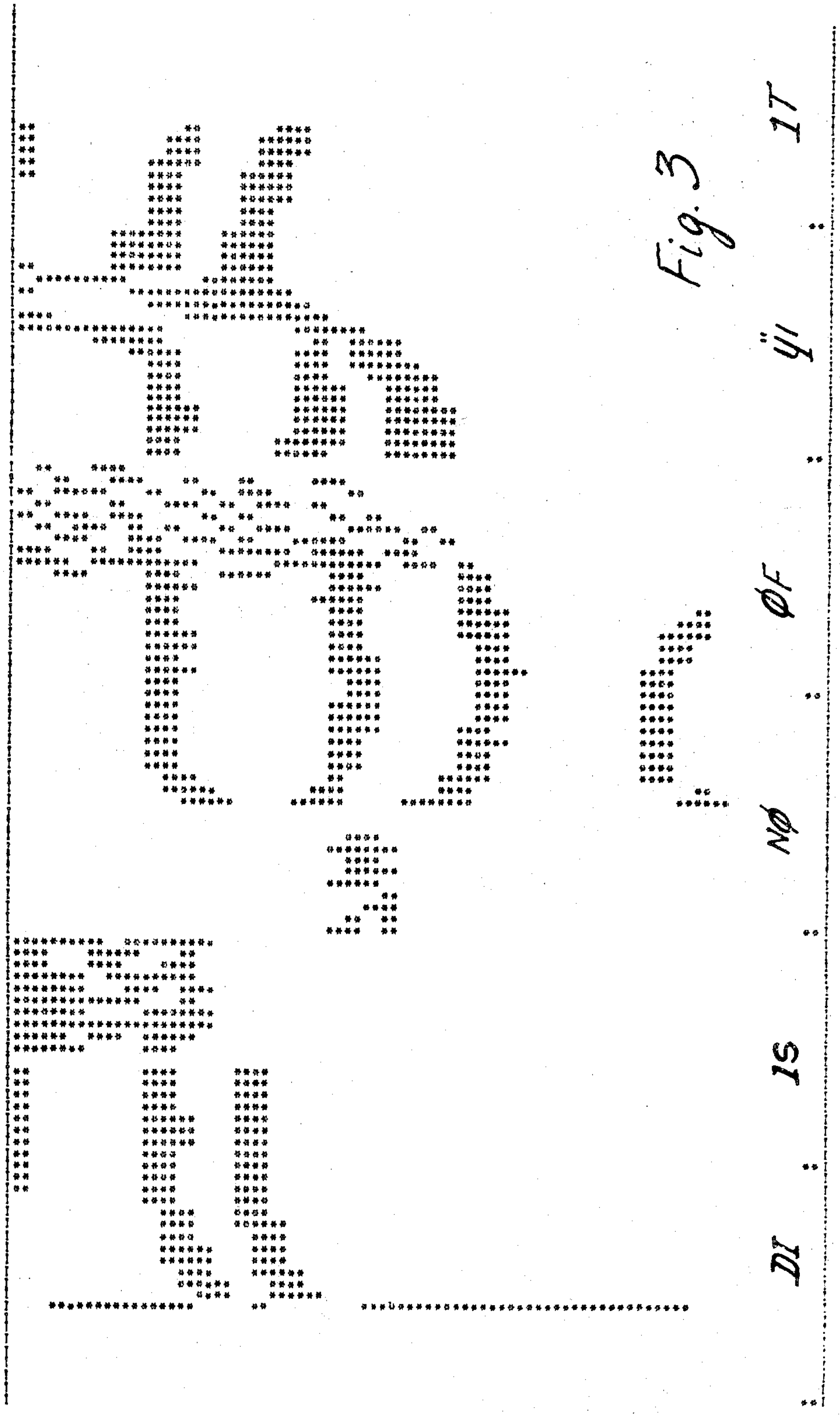
FIGS. 3,4 and 5 show digitalized spectrograms corresponding to sentences in the French, English and German languages, respectively.
Figure 4:
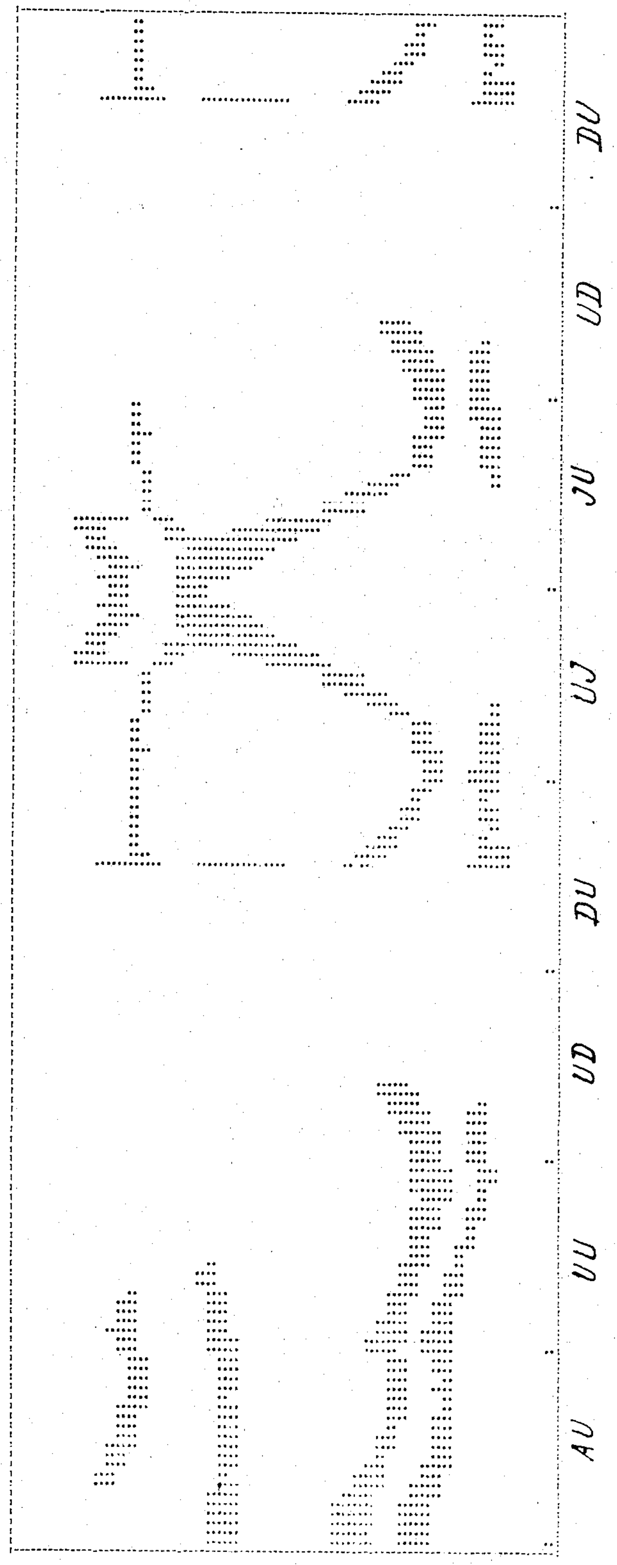
Figure 5:
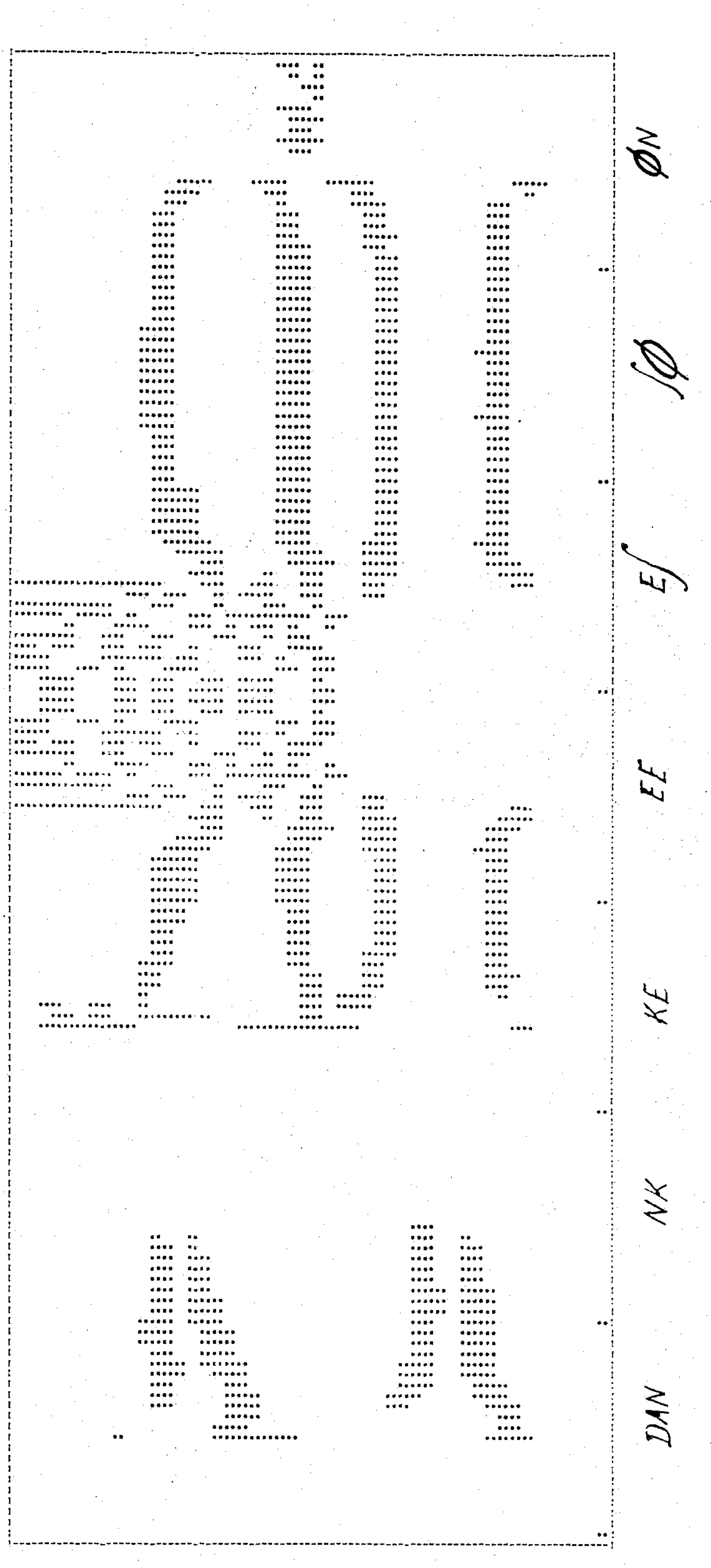

In FIGS. 3, 4 and 5, there are shown digitalized spectrograms derived from the corresponding analog spectrograms, this being effected by means which are not part of the invention. The digitalized spectrograms of FIGS. 3, 4 and 5 respectively correspond to the French words "dix, neuf, huit," to the English sentence "How do you do" and to the German sentence "Danke schon." When such digitalized spectrograms have been obtained, they can be translated into corresponding assemblies of binary-coded words.

In FIGS. 3, 4 and 5, each digitalized phoneme-pair is represented by a time succession of words (in the sense of numerical calculation), each having 44 bits. In FIGS. 3, 4 and 5, a bit is represented by two consecutive asterisks and a zero by two places free from asterisks. Each phoneme-pair comprises 20 words in time succession. In the latter figures, unity is represented by two asterisks present, and 0 by two asterisks absent.

Therefore, coded word assembly representing digitalized phoneme-pairs form the basic information stored in the talking machine according to the invention.

Figure 6:
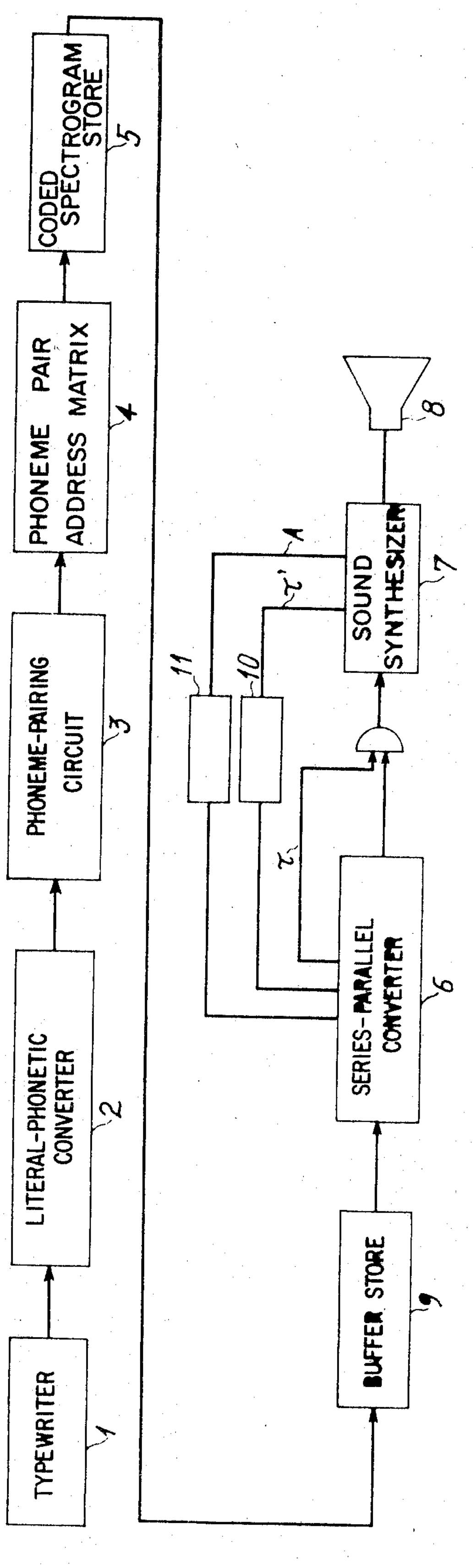
FIG. 6 shows the talking machine according to the invention in the form of a block diagram.

Referring to FIG. 6, the machine is made up of a chain comprising a peripheral apparatus which is a typewriter 1; a literal-phonetic converter 2; a circuit 3 grouping in pairs the coded phonemes leaving the converter 2, taking as the first phoneme of a particular group the last phoneme of the group immediately preceding; and an address matrix 4 enabling the address of the phoneme-pair formed by a group to be derived from the two phonemes of such group. The address matrix is associated with a store 5 in which all possible digitalized phoneme-pairs in the form of coded assemblies. The 20 words of 44 bits forming any such assembly are read in the store 5 in series and converted into parallel words in the series-parallel converter 6.

The converter 6 is connected to a sound synthesizer 7, The latter equipment is connected to a loudspeaker 8.

Figure 7:
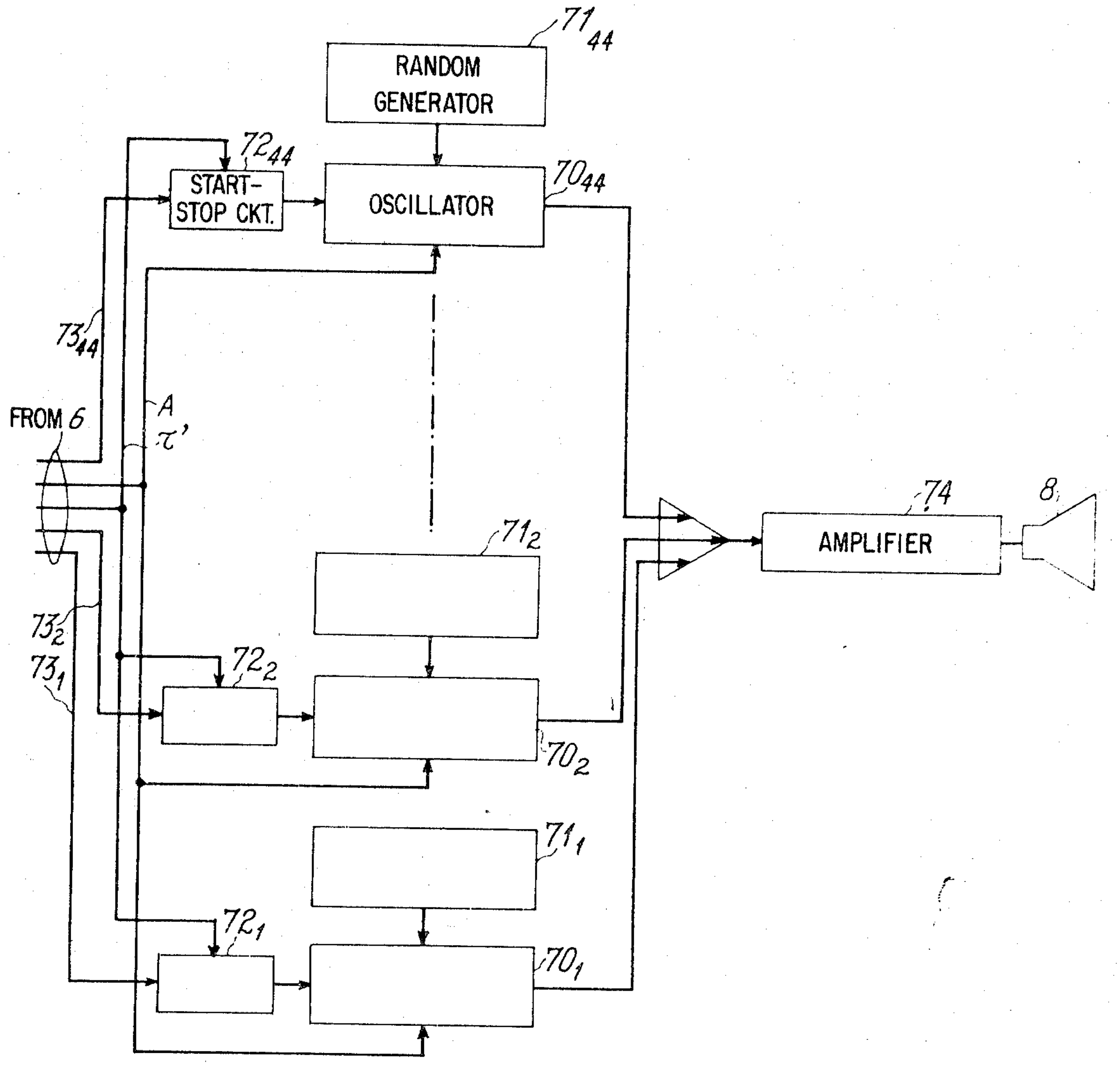
FIG. 7 shows the speech synthesizer included in the machine.

Referring to FIG. 7, the equipment 7 mainly comprises 44 sinusoidal oscillators $70_1$–$70_{44}$ which are adjusted to staged frequencies of 100–4,400 Hz., with a mean interval of 100 Hz. However, the interval between successive oscillators is not taken as exactly equal to 100 Hz., to avoid harmonicity of the components.

Each oscillator is piloted by a random generator, $71_1$–$71_{44}$, respectively, which acts on the frequency of oscillation of the oscillator. The object of this step is to give the whispered voice coming from the apparatus a fluid and natural sound to avoid monotony.

Each oscillator is controlled by a start-stop circuit, $72_1$–$72_{44}$, respectively, receiving via connections $73_1$–$73_{44}$ the bits of the words of 44 bits leaving the converter 6. This start-stop circuit controls the duration of operation of each oscillator. If we call the time separating the reading-out of two successive parallel words $\tau$, and we call the duration of operation of the oscillators $\tau'$, we have already seen that $\tau$ varied between 1 and 8 milliseconds; $\tau'$ can be adjusted between 0.25 $\tau$ and $\tau$.

In the store 5, a control word comprising three instructions is associated with each coded word representing a phoneme-pair, the three instructions being:

- an instruction concerning the rate of application of the words to the sound synthesizer (instruction $\tau$);
- an instruction of duration of oscillation $\tau'$; and, an instruction of amplitude of oscillation A. The words relating to $\tau'$ and A are converted into analog voltage in the digital-analog converters 10, 11 and act respectively on the controls for the duration of the circuits $72_1$–$72_{44}$ and on the controls for the amplitude of the oscillators $70_1$–$70_{44}$.

The output rhythm of the phoneme-pairs from the store 5 is a rhythm which varies in accordance with the localization of the phoneme-pairs in the store 5. The rhythm $1/\tau$ of access of the words to equipment 7 of FIG. 6 depends on the control words associated with the words of phoneme-pairs. A buffer store 9 must therefore be disposed between the circuits 5 and 6.

The converter 2 transforms a literal and spelled text into a succession of phonetic symbols which are the phonemes given in a table comprising the various phonemes necessary for the considered language.

Each literal word, defined as the sequence between two blanks, or between a blank and a punctuation mark, or between two punctuation marks, is introduced letter by letter, or more generally, character by character, into a store 201 from which it can be transferred to a read-out register 202. A permanent store 203 contains in coded form a table of all the words in the language in which the machine is operating which have a pronunciation differing phonetic from the phonetic pronunciation rules ("exorbitant" pronunciation). The code word which has been stored in 201, and the various words in the table 203, are compared in a comparator 205, and to this end the words of the store 203 are successively extracted and transferred to the register 204.

The comparison between the word to be pronounced and the words in the table is carried out letter by letter, starting from the left-hand side, as when looking up words in a dictionary. To this end, the comparator 205, an address register 206 associated with the table of exceptions 203 and a counter 208 are initiated by a signal over a cable 207 coming from a programmer (time-base generator) (not shown). The first word in the table of exceptions is transferred to the register 204. The counter 208 applies a signal to its first output, thus opening the gates $209_1$, $210_1$ (in fact, each gate $209_1$ or $210_1$ is formed by a group of gates of a number equal to the number of bits used in the machine to represent a character). The first letters of the two words written into 202 and 204 are compared with one another. If it is the same letter, a signal is sent via cable 211 to the counter 208 which advances by one step. All of the letters of the word to be pronounced and of the word of "exorbitant" pronunciation are compared with one another in the same way (only four gates 209 and four gates 210 are shown, but, of course, there are as many as there are letters in the longest word of unusual pronunciation). Each time that the letters of the same row are identical, the counter 208 advances by one step. If the letters are different, the comparator send a nonidentity signal via cable 212, which causes the address register 206 to advance by one step and the comparison of the word to be pronounced is continued with the second, third, third,...word the table of exceptions.

When a word to be pronounced is found to be equal to a word in the table of exceptions, a gate 213 is opened and the signal is delivered to a cable 214. The word written into 201 is erased.

Associated with the table of exceptions is a store 215 containing the phonetic equivalents of the words of unusual pronunciation. When a word of 203 is transferred to the register 204, the phonetic equivalent of such word is simultaneously transferred into a register 216. The signal over the cable 214 causes the code of the phonemes forming the phonetic equivalent of the word to be pronounced to be transferred to the circuit 3 in FIG. 7.

When the address register 206 is at its last address, and a nonidentity signal appears over the cable 212, gates 217, 218 are opened and the word to be pronounced passes from the readout 201 to a store 221 which is a shift register. Each letter of the word to be pronounced is transferred sequentially into a phoneme-detecting circuit 222 via the agency of a readout register 223. The detecting circuit comprises as many combination detectors as there are combinations of letters forming phonemes not corresponding to one single letter, for instance IN, ON, PH, QU.

For instance, if the word "Phoneme" is introduced into the shaft register 221, the letter P is transferred to the detecting circuit 222, followed by the letter H. The circuit 222 has a detector for the combination PH, and the output signal of such detector is the phoneme F. The phoneme F (or more precisely, its coded combination) is substituted for the combination PH in the shift register 221 via the agency of a rewrite register 224. Circuits for detecting particular combinations are familiar in the art and need not be described in detail in the present specification. Letters which, in combination with the letter immediately preceding them or the letter immediately following them, form pairs not detected by the circuit 222 are rewritten without change into the register 221.

Figure 8:
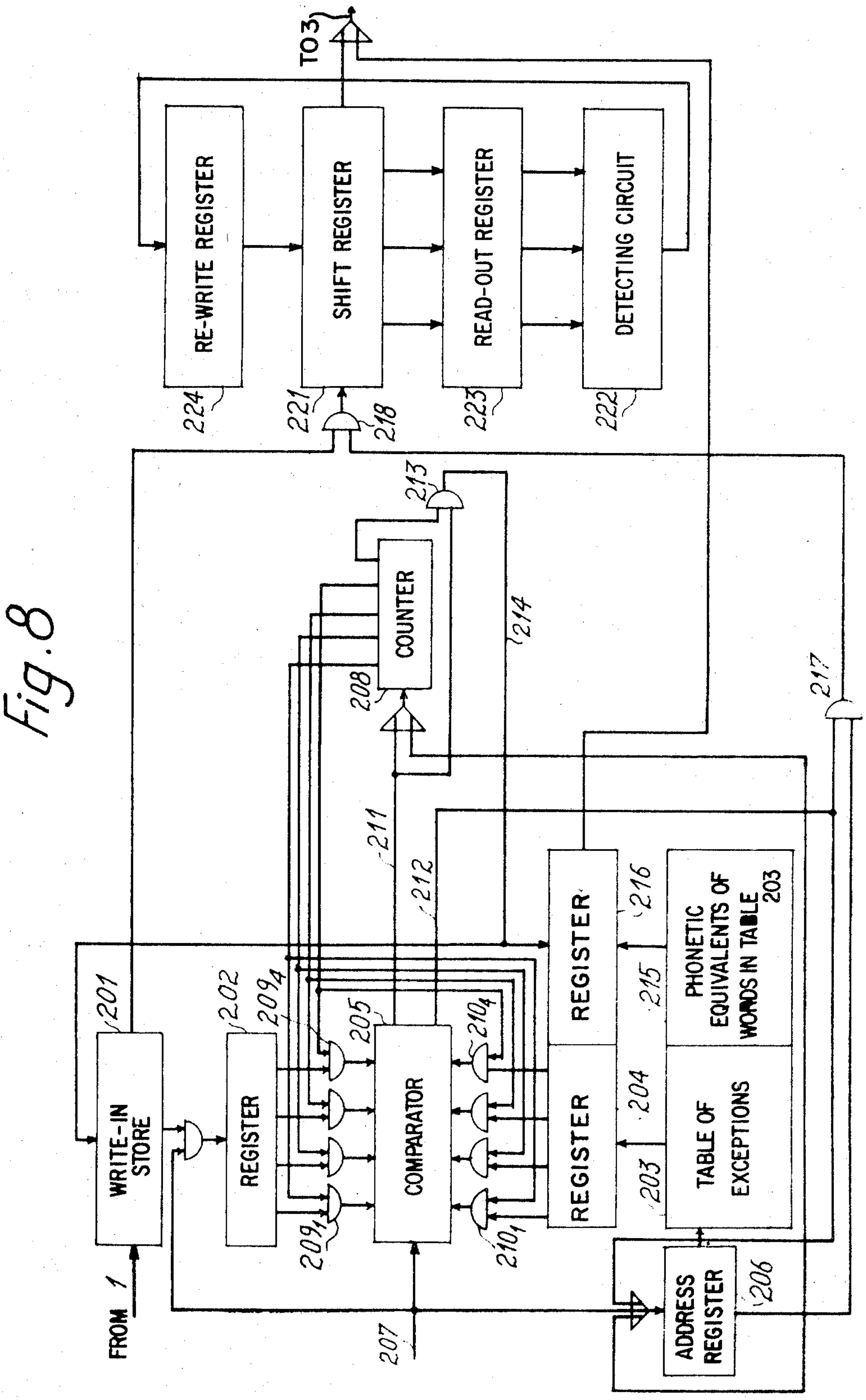
FIG. 8 shows the literal-phonetic converter included in the machine.

In the foregoing description of FIG. 8, the oscillators $70_1$–$70_4$ have been disclosed as having oscillating frequencies which are regularly spaced apart in the telephone band. These frequencies can be irregularly spaced apart in their frequency range. This may be accomplished by the utilization of a spectrum channel vocoder which is inserted into the circuit after the band-pass filter.

The foregoing description of the apparatus and its output demonstrates a practical embodiment of a machine for converting a printed text into one of the elements of speech wherein the literal characters of the text are converted into binary-coded characters and into a store of coded phonemes. Each of the binary-coded characters is compared sequentially to the coded phonemes stored. If a coded phoneme identical to the coded character is found, that phoneme is selected and is extracted from the store. If no phoneme identical to the character is found as a result of sequential comparison, the characters are compared to the phonemes in groups of two and then in groups of three, and the phonemes are then selected and extracted from the store. The present apparatus then provides means to associate the successively selected phonemes into phoneme-pairs. The phoneme-pairs are digitally written in the form of a plurality of words and these are stored.

The bits of a given word so digitally written represent the amplitudes of short-time spectrograms of the phoneme-pairs at points equally spaced apart along a line which is parallel to the frequency axis of the spectrogram. The apparatus next provides means for extracting from the store of digitally written words those words which represent the selected phoneme-pairs.

Each of a plurality of oscillators equal in number to the number of bits of the word, is driven by a generator means which controls the oscillators by the bits of the words. The vocal output is provided by a voice-reproducing means which is connected in parallel to the outputs of all of the oscillators.

What we claim is:

1. A machine for converting a text printed in literal characters into speech comprising: means for sequentially converting the literal characters of said text into binary-coded characters; a store of coded phonemes; means for sequentially comparing each of said coded characters to said coded phonemes and selecting from the coded phoneme store the phoneme equivalent to this character; means for sequentially comparing a group of successive coded characters to said coded phonemes and selecting from the coded phoneme store the phoneme equivalent to this character group when the comparison of the same group except its last character to the coded phonemes has resulted in no coded phoneme selection; an address matrix to which are sequentially applied all selected phonemes, the last phoneme of a phoneme-pair being the first phoneme of the following phoneme-pair; a store of coded word assemblies respectively representing the spectrograms of said coded phoneme pairs and consisting in the registration of said spectrograms in the time-frequency plane in which the amplitude at a point of said time-frequency plane is selectively represented by either a one or a zero, according to the value of the spectrogram amplitude at said point with respect to a given reference value, whereby each phoneme-pair spectrogram is coded into an assembly of N-bit binary words whose bits represent the values of the amplitude at N-points regularly spaced apart along a line parallel to the frequency axis of the spectrogram; means controlled by said address matrix for sequentially extracting from said coded word assembly store the coded word assembly corresponding to the addresses obtained at the output of said matrix; a plurality of n oscillators having frequencies spaced apart in the speech band; means for successively controlling said oscillators respectively by the bits of said extracted coded words; a sound-reproducing means; and means for connecting to said sound-reproducing means the output signals of said oscillators.

2. A machine for converting a text printed in literal characters into speech as set forth in claim 1, in which each coded word is associated with a first auxiliary word giving the time-interval between the successive control of the oscillators by said coded word and the next coded word, and the machine further comprises means for reading said first auxiliary word and gating means controlled by said reading means for applying said coded words to said oscillators.

3. A machine for converting a text printed in literal characters into speech as set forth in claim 1, in which each coded word is associated with a second auxiliary word giving the duration of operation of the oscillators when they are controlled by one digit of the coded word, and the machine further comprises means for reading said second auxiliary word and Start-stop means for the oscillators controlled by said reading means.

4. A machine for converting a text printed in literal characters into speech as set forth in claim 1, in which the oscillators have randomly varying frequencies in frequency bandwidths respectively allotted thereto.

* * * * *